(12) United States Patent
Hui

(10) Patent No.: US 8,982,945 B2
(45) Date of Patent: Mar. 17, 2015

(54) APPARATUS, METHOD, AND COMPUTER PROGRAM FOR ENCODING VIDEO INFORMATION USING A VARIABLE BIT-RATE

(75) Inventor: Lucas Y. W. Hui, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 2092 days.

(21) Appl. No.: 10/700,877

(22) Filed: Nov. 4, 2003

(65) Prior Publication Data

US 2005/0094725 A1 May 5, 2005

(51) Int. Cl.
*H04N 7/12* (2006.01)
*H04N 11/02* (2006.01)
*H04N 11/04* (2006.01)
*H04N 19/114* (2014.01)
*H04N 19/124* (2014.01)
*H04N 19/136* (2014.01)
*H04N 19/152* (2014.01)
*H04N 19/172* (2014.01)
*H04N 19/179* (2014.01)
*H04N 19/46* (2014.01)

(52) U.S. Cl.
CPC ............ *H04N 19/179* (2013.01); *H04N 19/114* (2013.01); *H04N 19/124* (2013.01); *H04N 19/136* (2013.01); *H04N 19/152* (2013.01); *H04N 19/172* (2013.01); *H04N 19/46* (2013.01)
USPC ................................ 375/240.02; 375/240.03

(58) Field of Classification Search
USPC ........................................ 375/240.02, 240.03
See application file for complete search history.

(56) References Cited

U.S. PATENT DOCUMENTS

| 6,510,176 B1 * | 1/2003 | Fukuda et al. ............ 375/240.02 |
| 6,601,104 B1 * | 7/2003 | Fallon ........................... 709/231 |
| 6,895,050 B2 * | 5/2005 | Lee ............................ 375/240.03 |

FOREIGN PATENT DOCUMENTS

| EP | 1 051 853 | 11/2000 |
| EP | 1 074 148 | 2/2001 |

* cited by examiner

*Primary Examiner* — Chikaodili E Anyikire
(74) *Attorney, Agent, or Firm* — Allen, Dyer, Doppelt, Milbrath & Gilchrist, P.A.

(57) ABSTRACT

An apparatus, method, and computer program encode video information. The apparatus, method, and computer program use a global deviation for previously encoded video information to encode additional video information. The global deviation represents a difference between (1) at least one expected characteristic of the previously encoded video information if encoded at a target bit-rate and (2) at least one actual characteristic of the previously encoded video information. The apparatus, method, and computer program use the global deviation to adjust at least one encoding parameter, which is then used to encode the additional video information.

29 Claims, 3 Drawing Sheets

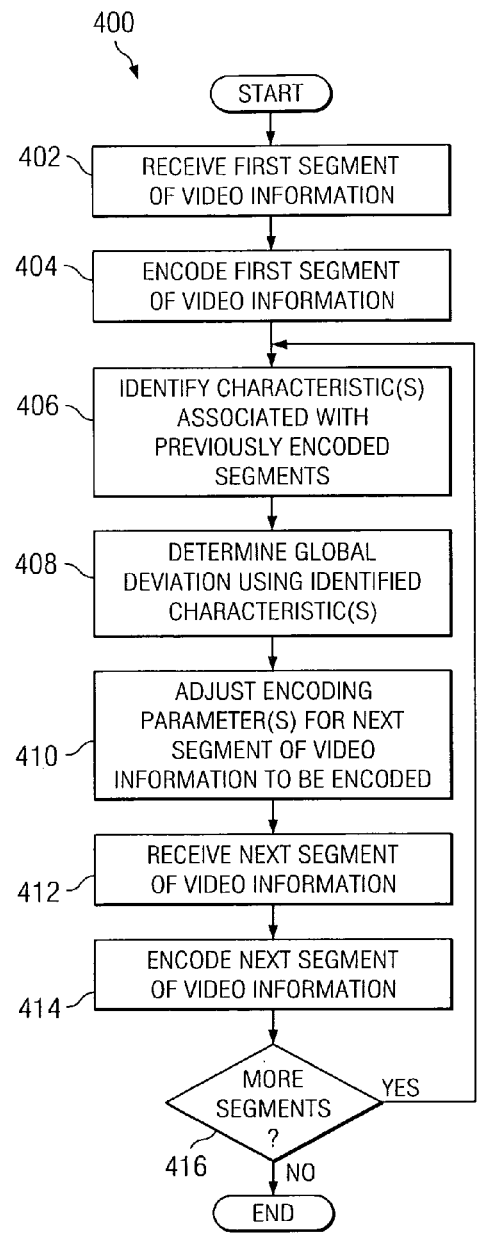
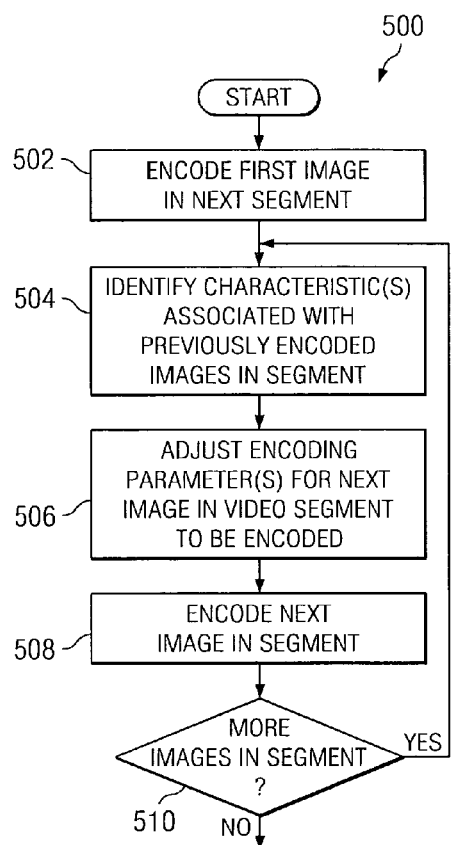
FIG. 4
FIG. 5

APPARATUS, METHOD, AND COMPUTER PROGRAM FOR ENCODING VIDEO INFORMATION USING A VARIABLE BIT-RATE

TECHNICAL FIELD

This disclosure is generally directed to video compression systems and more specifically to an apparatus, method, and computer program for encoding video information using a variable bit-rate.

BACKGROUND

Video compression systems are becoming more and more useful in various applications. For example, video compression is often used to encode video information for storage on digital versatile disks (DVDs) or hard disk drives (HDDs). As another example, video compression is often used during real-time streaming of multimedia content over a network, such as the Internet.

Conventional video compression systems often attempt to encode video information at a target or desired bit-rate. These systems typically have difficulty identifying an appropriate target bit-rate for specific video information. As a result, the conventional video compression systems are often unable to effectively compress video information.

SUMMARY

This disclosure provides an apparatus, method, and computer program for encoding video information using a variable bit-rate.

In one aspect, a method for encoding video information includes determining a global deviation associated with first video information. The global deviation represents a difference between (1) at least one expected characteristic of the first video information if encoded at a target bit-rate and (2) at least one actual characteristic of the first video information when encoded. The method also includes adjusting at least one encoding parameter used to encode second video information based at least partially on the global deviation.

In particular aspects, the at least one expected characteristic includes an expected duration and/or an expected size of the first video information if encoded at the target bit-rate. The at least one actual characteristic includes an actual duration and/or an actual size of the first video information when encoded. The at least one encoding parameter includes a segment duration, a maximum encoding quality, and/or a minimum encoding quality used to encode the second video information.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

BRIEF DESCRIPTION OF THE DRAWINGS

For a more complete understanding of this disclosure and its features, reference is now made to the following description taken in conjunction with the accompanying drawings, in which:

FIG. 4 illustrates an example method for encoding video information using a variable bit-rate according to one embodiment of this disclosure; and FIG. 5 illustrates an example method for encoding a segment of video information according to one embodiment of this disclosure.

DETAILED DESCRIPTION

Figure 1:
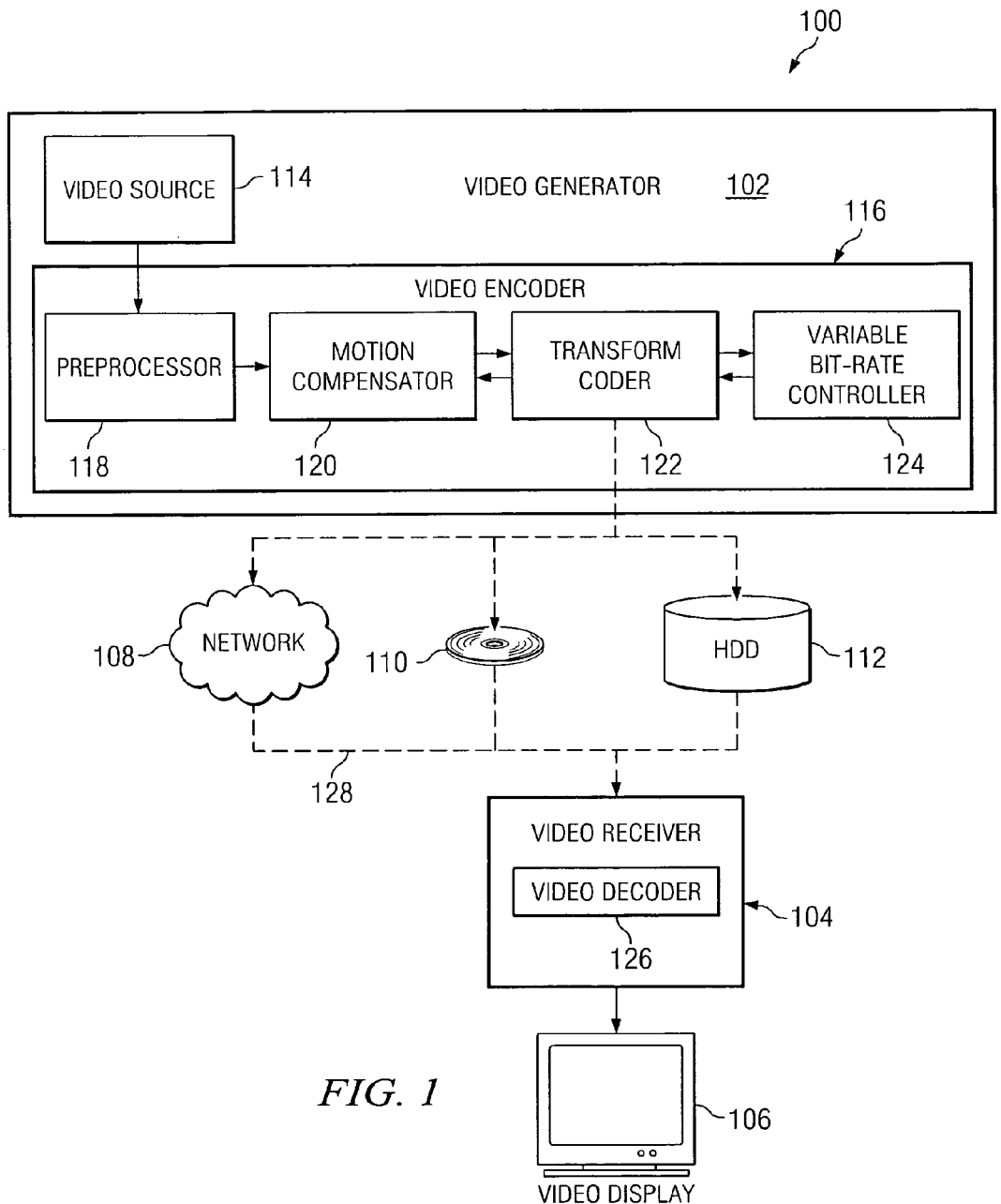
FIG. 1 illustrates an example video system according to one embodiment of this disclosure.

FIG. 1 illustrates an example video system 100 according to one embodiment of this disclosure. In the illustrated example, the system 100 includes a video generator 102, a video receiver 104, and a display device 106. The video system 100 shown in FIG. 1 is for illustration only. Other embodiments of the system 100 may be used without departing from the scope of this disclosure.

In one aspect of operation, the video generator 102 encodes video information for use by one or more video receivers 104. The video generator 102 uses a global or total deviation associated with a target bit-rate to encode the video information. In some embodiments, the global deviation at time t represents the difference between (1) the expected duration or size of the video information encoded up to time t if encoded using the target bit-rate, and (2) the actual duration or size of the video information encoded up to time t. The video generator 102 then uses the global deviation to encode additional video information. In particular embodiments, the video generator 102 encodes video information in segments, and the video generator 102 adjusts the size of each segment based on the global deviation in previous segments. This may allow, for example, the video generator 102 to more effectively encode video information.

In the illustrated example, the video generator 102 generates encoded video information. In this document, the phrase "video information" refers to information representing a sequence of video images. The video generator 102 represents any suitable apparatus, system, or mechanism for producing or otherwise providing encoded video information. For example, the video generator 102 could represent a streaming-video transmitter capable of transmitting streaming video to a video receiver 104 over a data network 108, such as the Internet. The video generator 102 could also represent a digital versatile disk (DVD) burner capable of producing a DVD 110 containing the encoded video information. The video generator 102 could further represent a software application capable of encoding video information for storage on a hard disk drive (HDD) 112. The video generator 102 includes any hardware, software, firmware, or combination thereof for encoding video information.

The video receiver 104 decodes the encoded information generated by the video generator 102. The video receiver 104 represents any suitable apparatus, system, or mechanism for processing encoded video information. For example, the video receiver 104 could represent a streaming-video receiver capable of receiving streaming video from the video generator 102 over a network 108. The video receiver 104 could also represent a DVD player capable of playing a DVD 110 containing encoded video information. The video receiver 104 could further represent a software application capable of decoding video information stored on a hard disk drive 112.

The video receiver 104 includes any hardware, software, firmware, or combination thereof for decoding video information.

In the illustrated example, the video receiver 104 decodes encoded video information and provides the information to a display device 106 for presentation to a viewer. The display device 106 represents any suitable device, system, or structure for presenting video information to one or more viewers. The display device 106 could, for example, represent a television, computer monitor, or projector. The video receiver 104 could provide the decoded video information to any other or additional destination, such as a video cassette player (VCR).

In the illustrated embodiment, the video generator 102 includes a video source 114. The video source 114 provides video information to be encoded by the video generator 102. The video source 114 represents any device, system, or structure capable of generating or otherwise providing uncompressed video information. The video source 114 could, for example, include a television receiver, a VCR, a video camera, a storage device capable of storing raw video data, or any other suitable source of video information. Although FIG. 1 illustrates the video source 114 as forming part of the video generator 102, the video source 114 could also reside external to the video generator 102.

A video encoder 116 is coupled to the video source 114. In this document, the term "couple" and its derivatives refer to any direct or indirect communication between two or more elements, whether or not those elements are in physical contact with one another. The video encoder 116 encodes or compresses the video information supplied by the video source 114. The video encoder 116 uses any suitable technique to encode video information. The video encoder 116 includes any hardware, software, firmware, or combination thereof for compressing video information.

In the illustrated example, the video encoder 116 includes a pre-processor 118, a motion compensator 120, a transform coder 122, and a variable bit-rate controller 124. The pre-processor 118 prepares the video information from the video source 114 for further processing by the video encoder 116. In some embodiments, the pre-processor 118 performs noise reduction, inverse telecine, and scene change detection. The pre-processor 118 could also receive video information from the video source 114 in one format and convert the information into another format. The pre-processor 118 includes any hardware, software, firmware, or combination thereof for pre-processing video information. In other embodiments, the pre-processor 118 may be omitted from the video encoder 116.

The motion compensator 120 and the transform coder 122 encode the pre-processed video information produced by the pre-processor 118. In some embodiments, the video encoder 116 encodes video information using motion compensated discrete cosine transform (MC-DCT) coding. In these embodiments, video information is encoded into a base layer and an enhancement layer. The base layer represents a minimum amount of data needed to decode the video information. The enhancement layer represents additional data that can be used to enhance the base layer. For example, the base layer may represent data used to produce a minimum-quality image on the display device 106, and the enhancement layer represents data used to increase the quality of the minimum-quality image. In this example, the video encoder 116 uses motion-compensated predictive coding provided by the motion compensator 120 for the base layer and discrete cosine transform (DCT) residual coding provided by the transform coder 122 for the enhancement layer.

While the motion compensator 120 and the transform coder 122 represent one possible mechanism for encoding video information, other embodiments of the video encoder 116 could be used. The motion compensator 120 and the transform coder 122 represent any hardware, software, firmware, or combination thereof for encoding video information. For example, the motion compensator 120 and the transform coder 122 may implement any video compression algorithm that uses rate control to alter the bit-rate used during encoding, such as Motion Pictures Expert Group (MPEG) or International Telecommunication Union—Telecommunications (ITU-T) H.261, H.263, or H.264 encoding.

In the illustrated embodiment, the video receiver 104 includes a video decoder 126. The video decoder 126 receives and decodes or decompresses the video information. The video decoder 126 uses any suitable technique to decode video information. In particular embodiments, the video decoder 126 attempts at a minimum to decode the base layer of compressed video information. Depending on the situation, the video decoder 126 may be able to decode none, some, or all of the enhancement layer. For example, the video receiver 104 may lack the processing power to decode the enhancement layer, so the video decoder 126 decodes only the base layer. As another example, a communication channel 128 coupling the video receiver 104 to the data network 108 may lack the bandwidth to transfer all enhancement layer data, so the video decoder 126 decodes the base layer and part of the enhancement layer. The video decoder 126 includes any hardware, software, firmware, or combination thereof for decoding video information.

Figure 2:
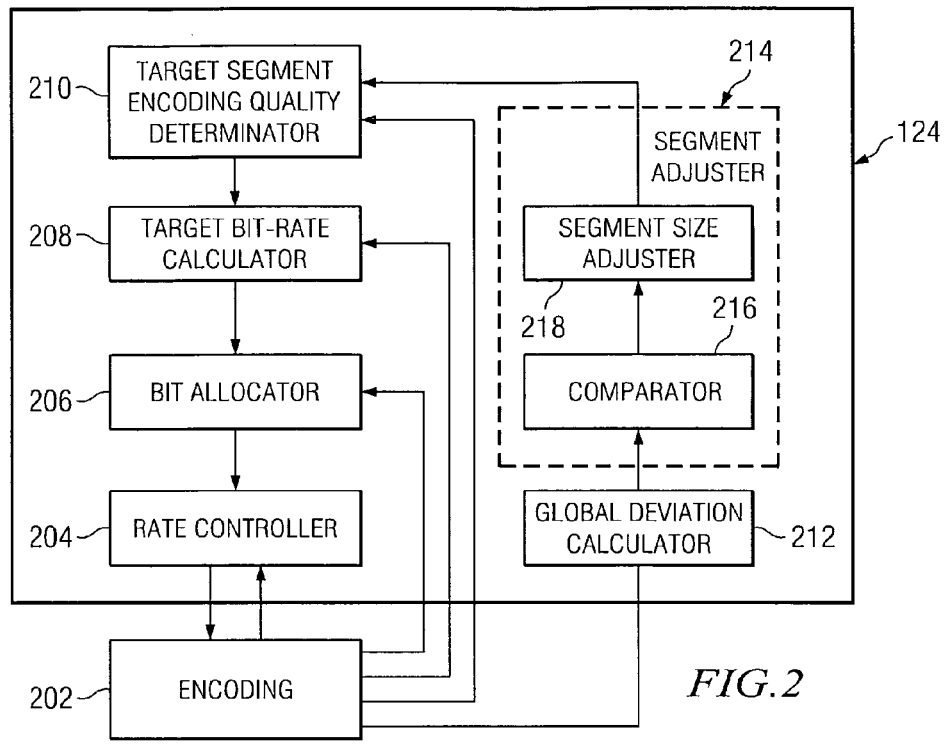
FIG. 2 illustrates an example variable bit-rate controller according to one embodiment of this disclosure.
Figure 3:
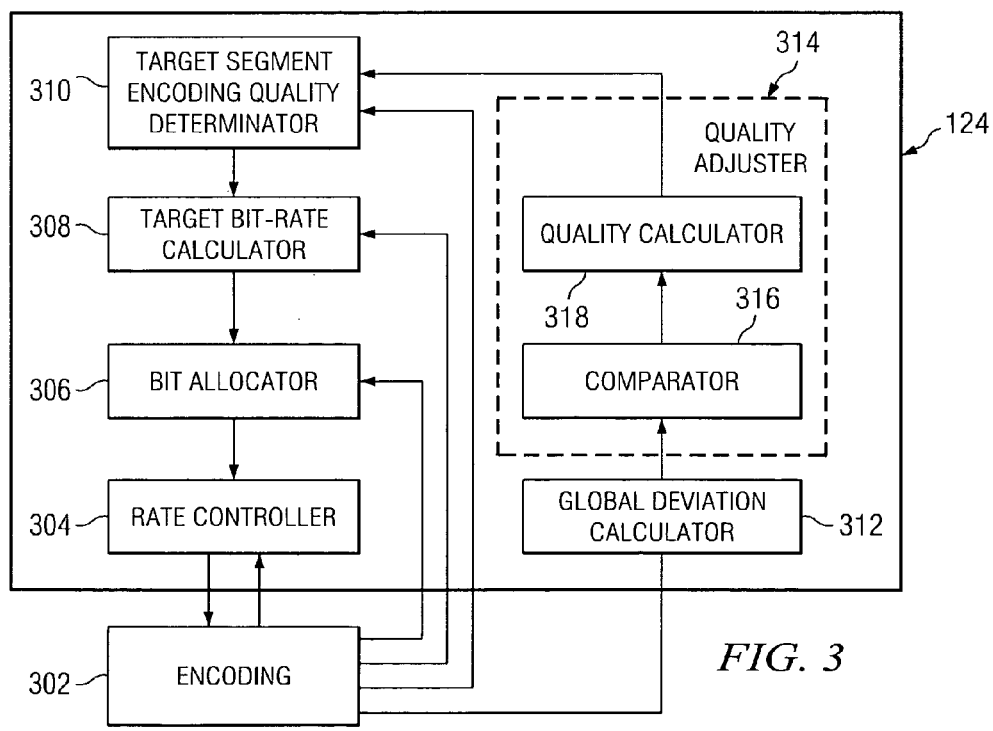
FIG. 3 illustrates another example variable bit-rate controller according to one embodiment of this disclosure.

The variable bit-rate controller 124 controls the operation of the video encoder 116. In particular, the controller 124 controls the operation of the video encoder 116 so that the video encoder 116 encodes video information at or near a target bit-rate. For example, the motion compensator 120 or the transform coder 122 may operate using a bit-rate specified by the controller 124, and the controller 124 varies the bit-rate as needed. The controller 124 includes any hardware, software, firmware, or combination thereof for controlling the operation of the video encoder 116. Example embodiments of the variable bit-rate controller 124 are shown in FIGS. 2 and 3, which are described below.

As described above, the variable bit-rate controller 124 controls the operation of the video encoder 116 so that the video encoder 116 encodes video information at or near a target or desired bit-rate. Maintaining a target bit-rate is often desirable or even required in many applications. For example, maintaining a target bit-rate may be needed to ensure that the bandwidth of a communication channel 128 is not exceeded or that the capacity of a fixed storage medium (such as hard disk drive 112) is not exceeded.

To control the video encoder 116, the variable bit-rate controller 124 uses a global or total deviation between one or more expected characteristics and one or more actual characteristics of the compressed video information. For example, the global deviation at any instance t in time could represent the difference between (1) the expected duration or size of video information encoded up to time t if encoded using the target bit-rate and (2) the actual duration or size of the video information encoded up to time t. Other or additional types of deviations could be used by the variable bit-rate controller 124 to control the video encoder 116.

In some embodiments, the video encoder 116 encodes video information in segments. A segment of video information represents multiple images from a video sequence. During encoding, the video encoder 116 may encode segments of different sizes. For example, the video encoder 116 may encode a first segment of video information having a first duration. The variable bit-rate controller 124 identifies a global deviation by calculating a difference between (1) the expected duration or size of the first encoded segment if encoded at a target bit-rate and (2) the actual duration or size of the first encoded segment. The video encoder 116 may then encode a second segment of video information having a second duration, where the second duration is based on the identified deviation.

In other embodiments, the video encoder 116 encodes video information in segments, and the quality of the encoding varies based on the global deviation. For example, the video encoder 116 may encode a first segment of video information at a first quality. The variable bit-rate controller 124 identifies a global deviation by calculating a difference between (1) the expected duration or size of the first encoded segment if encoded at a target bit-rate and (2) the actual duration or size of the first encoded segment. The video encoder 116 then encodes a second segment of video information, and the maximum and minimum qualities used to encode the second segment are based on the identified deviation.

In yet other embodiments, the variable bit-rate controller 124 uses a combination of these techniques to control the encoding of video information. For example, the controller 124 may both adjust the duration of the encoded video segments and adjust the quality of the encoded video segments.

In particular embodiments, for each segment of video information that is encoded, the controller 124 identifies the segment bit-rate or segment size for that encoded segment. The segment bit-rate identifies the actual bit-rate used to encode the segment, and the segment size identifies the actual number of bits in the encoded segment. A global deviation is calculated using the segment bit-rate or size of each previously-encoded segment. To encode another segment, the controller 124 identifies a target segment bit-rate and a target segment encoding quality using the segment bit-rates or sizes and the global deviation. The target segment bit-rate and target segment encoding quality identify the bit-rate and quality to be used to encode the next video segment.

The video encoder 116 then begins to encode the video information in the next segment. For each image in the segment that is encoded, the variable bit-rate controller 124 identifies an instant bit-rate or bit size and an instant encoding quality. The instant bit-rate identifies the actual bit-rate used to encode an image, and the instant bit size identifies the actual number of bits in the encoded image. To encode another image in the segment, the controller 124 identifies a target instant bit-rate using the instant encoding qualities, instant bit-rates or sizes, and target segment encoding quality. The next image is then encoded using the identified target instant bit-rate.

Any suitable technique may be used to encode each image in a segment. For example, an image may be encoded by dividing the image into macro-blocks and encoding these blocks using MC-DCT coding. As a particular example, an image may be encoded using the identified target instant bit-rate, and rate control techniques regulate the bit-rate used for each macro-block in the image.

Although FIG. 1 illustrates one example of a video system 100, various changes may be made to FIG. 1. For example, FIG. 1 illustrates that compressed video information may be supplied to a video receiver 104 over a network 108, using a DVD 110, or on a hard disk drive 112. The video encoder 116 could also place the encoded video information on any other suitable storage medium or otherwise communicate the information in any suitable manner. Also, FIG. 1 illustrates one example of an apparatus in which the video encoder 116 may be used. The video encoder 116 may be used in any other apparatus or system. Further, the video generator 102 and the video receiver 104 may be combined into a single device or apparatus. In addition, FIG. 1 illustrates that the variable bit-rate controller 124 forms part of the video encoder 116. In other embodiments, the variable bit-rate controller 124 resides external to the video encoder 116.

FIG. 2 illustrates an example variable bit-rate controller 124 according to one embodiment of this disclosure. In particular, FIG. 2 illustrates a variable bit-rate controller 124 that alters the size or duration of video segments encoded by a video encoder 116, and the controller 124 alters the size or duration of the video segments as needed. The controller 124 shown in FIG. 2 is for illustration only. Other embodiments of the variable bit-rate controller 124 may be used without departing from the scope of this disclosure.

As shown in FIG. 2, the variable bit-rate controller 124 is coupled to an encoding mechanism 202. In some embodiments, the encoding mechanism 202 represents the motion compensator 120 and the transform coder 122 of FIG. 1. The encoding mechanism 202 could, for example, implement MPEG-2 encoding with I-picture, P-picture, and B-picture coding applied to input video information. In this example, encoding is performed using motion compensation and DCT coding on macro-blocks in images to be coded. The variable bit-rate controller 124 examines the encoded video information produced by the encoding mechanism 202 and adjusts the bit-rate used by the encoding mechanism 202 as needed.

In an example embodiment, the controller 124 uses a global deviation in previously encoded segments of video information to adjust the bit-rate used by the encoding mechanism 202. In some embodiments, the global deviation represents a difference between the expected and actual durations of the video segments previously compressed. In particular embodiments, a global deviation time $T_{deviation}$ at any instance $T_{current}$ is determined using the equation:

$$T_{deviation} = T_{target} - T_{current} = \frac{Bit_{cumulated}}{Bit\_Rate_{target}} - T_{current}, \quad (1)$$

where $Bit\_Rate_{target}$ represents the target bit-rate, $T_{target}$ represents the expected duration of the previously encoded segments if encoded at the target bit-rate, and $Bit_{cumulated}$ represents the total number of bits actually generated up to time $T_{current}$. Specifying a maximum value for the deviation time $T_{deviation}$ may help to ensure that at any instance during encoding, the best-case or worst-case remaining recording time for a storage device can be determined.

In other particular embodiments, the global deviation represents a global bit deviation $Bit_{deviation}$, which is determined using the equation:

$$Bit_{deviation} = Bit_{cumulated} - Bit_{target} = \\ Bit_{cumulated} - (T_{current} \times Bit\_Rate_{target}), \quad (2)$$

where $Bit_{target}$ represents the expected size of the previously encoded segments if encoded at the target bit-rate.

In the illustrated embodiment, the variable bit-rate controller 124 includes a rate controller 204. The rate controller 204 controls the bit-rate used by the encoding mechanism 202 to encode the video information. For example, the rate controller 204 may output a signal identifying the bit-rate to be used by the encoding mechanism 202 to encode video information. As a particular example, the rate controller 204 may output signals identifying the bit-rates to be used by the encoding mechanism 202 to encode macro-blocks in an image.

The rate controller 204 operates under the control of a bit allocator 206. The bit allocator 206 identifies an image-level bit-rate to be used to encode a video image. The bit allocator 206 may identify the image-level bit-rate in any suitable manner. For example, the bit allocator 206 may identify the image-level bit-rate using a target instant bit-rate, which as described above represents the desired bit-rate to be used to encode an image.

The target instant bit-rate used by the bit allocator 206 is provided by a target bit-rate calculator 208. The target bit-rate calculator 208 uses any suitable technique to identify a target bit-rate for an image. For example, the target bit-rate calculator 208 may determine a target instant bit-rate at the image level using a target segment encoding quality. The target segment encoding quality represents the desired encoding quality to be used to encode a segment of video information, including the image currently being compressed.

The target segment encoding quality used by the target bit-rate calculator 208 is provided by a target segment encoding quality determinator 210. In some embodiments, to the extent possible, the quality determinator 210 attempts to maintain a constant subjective video quality in the encoded video information. For example, the quality determinator 210 may adjust the target segment encoding quality supplied to the target bit-rate calculator 208 as needed. In particular embodiments, the target segment encoding quality for the current segment is determined using the segment bit-rates or sizes of previously encoded segments and the actual overall bit-rate of the segments. In this way, the quality determinator 210 attempts to ensure that the actual overall bit-rate converges with an overall target bit-rate.

As shown in FIG. 2, the operation of the quality determinator 210 is controlled by a global deviation calculator 212 and a segment adjuster 214. The global deviation calculator 212 identifies the global deviation for previously encoded video segments. For example, the global deviation calculator 212 may identify the global deviation using Equations (1) or (2) shown above. The global deviation calculator 212 provides the identified global deviation to the segment adjuster 214.

The segment adjuster 214 uses the identified global deviation to alter the size of the next video segment to be encoded by the encoding mechanism 202. For example, the segment adjuster 214 may use the output of the global deviation calculator 212 to adjust the operation of the quality determinator 210. Because the segment adjuster 214 may alter the way in which video information is encoded, the segment adjuster 214 may be referred to as an encoding adjuster.

In this example, the segment adjuster 214 includes a comparator 216 and a segment size adjuster 218. The comparator 216 receives the identified global deviation and compares the global deviation to a threshold. In particular embodiments, the comparator 216 determines whether the absolute value of the identified global deviation exceeds a threshold.

The segment size adjuster 218 adjusts the size of the next segment to be encoded using the output of the comparator 216. For example, the segment size adjuster 218 could increase the segment size of the next video segment if the absolute value of the identified global deviation does not exceed the threshold. Also, the segment size adjuster 218 could decrease the segment size of the next video segment if the absolute value of the identified global deviation does exceed the threshold.

In this way, the segment adjuster 214 may alter the way in which video information is encoded. For example, when the absolute value of the global deviation is low, the latency of the loop formed by elements 204-210 may be increased to maintain greater stability in subjective video quality. If the absolute value of the global deviation is high, the latency of the loop may be decreased to speed up the convergence of the actual bit-rate towards the target bit-rate and to prevent the global deviation from increasing further.

In particular embodiments, the target segment encoding quality determinator 210 operates using the following equations:

$$\Delta \text{Bit}[i-1] = \quad (3)$$
$$(\text{Bit\_Rate}_{seg\_target}[i-1] - \text{Bit\_Rate}_{seg\_actual}[i-1]) \times \frac{M_{seg}[i-1]}{\text{Picture\_Rate}}$$

$$\text{Bit\_Rate}_{seg\_target}[i] = \text{Bit\_Rate}_{target} + \left( \sum_{j=i-1}^{i-4} \left( \frac{\Delta \text{Bit}[j]}{4} \right) \times \frac{\text{Picture\_Rate}}{M_{seg}[i]} \right) \quad (4)$$

$$\Delta Q_{target} = \quad (5)$$
$$\frac{Q_{target}[i-1] \times (\text{Bit\_Rate}_{seg\_actual}[i-1] - \text{Bit\_Rate}_{seg\_target}[i])}{K_\gamma \times \text{Bit\_Rate}_{seg\_actual}[i-1]}$$

$$Q_{target}[i] = Q_{target}[i-1] + \Delta Q_{target}. \quad (6)$$

In Equation (3), the bit difference ($\Delta$Bit) for a previously encoded segment (the i–1$^{th}$ segment) is calculated based on the target segment bit-rate (Bit\_Rate$_{seg\_target}$), the actual segment bit-rate (Bit\_Rate$_{seg\_actual}$), the size of the previous segment ($M_{seg}$), and the picture rate. The picture rate represents the rate at which images in the previously encoded segment are received. Equation (4) identifies the target segment bit-rate of a new segment (the i$^{th}$ segment) to be encoded based on the target sequence bit-rate (Bit\_Rate$_{target}$) and bit differences of four previous segments (the i–4$^{th}$ through the i–1$^{th}$ segments). Based on a rate-quantization model, a quantization difference ($\Delta Q_{target}$) is determined in Equation (5), where $Q_{target}$ is the target quantization of a previous segment and $K_\gamma$ is a constant for the current rate-quantization model. A target quantization for a new segment is determined in Equation (6) and is defined as the target segment encoding quality.

In these embodiments, the segment size adjuster 218 adjusts the segment size $M_{seg}$ using the absolute value of the global deviation $|T_{deviation}|$. In particular embodiments, the segment size adjuster 218 identifies the new segment size $M_{seg}$ using the equation:

$$M_{seg}[i] = \min\left( \frac{K_2}{|T_{deviation}[i-1]|}, M_{max\_seg} \right) \quad (7)$$

where $M_{max\_seg}$ represents a predetermined maximum segment size, and $K_2$ is a constant. The calculated segment size $M_{seg}$ may be rounded to the nearest group of pictures (as defined in the MPEG standard) to simplify implementation. Also, any suitable constant $K_2$ may be used according to different application requirements.

In other embodiments, the segment size $M_{seg}$ may be determined using one or more suitably determined thresholds for the global deviation. For example, the segment size $M_{seg}$ could be identified using the equation:

$$\text{if}(T_{deviation} > T_{threshold1}), M_{seg}[i] = M_{size1}, \text{else}$$
$$\text{if}(T_{deviation} > T_{threshold2}), M_{seg}[i] = M_{size2}, \text{else} \quad (8)$$
$$\ldots$$

where $T_{threshold1}$ and $T_{threshold2}$ represent thresholds and $M_{size1}$ and $M_{size2}$ represent possible segment sizes. This represents a series of IF-THEN-ELSE statements that selects a value for the segment size $M_{seg}$.

In particular embodiments, the rate controller 204 and the bit allocator 206 implement the MPEG-2 Test Mode 5 (TM5) rate control and bit allocation algorithms, respectively. Also, the encoding mechanism 202, rate controller 204, and bit allocator 206 implement video buffer verifier (VBV) control methods.

The various components 204-214 of the variable bit-rate controller 124 may represent hardware, software, firmware, or combination thereof. For example, the components 204-214 could represent software routines executed by one or more processors.

Although FIG. 2 illustrates one example of a variable bit-rate controller 124, various changes may be made to FIG. 2. For example, the functional division of the controller 124 shown in FIG. 2 is for illustration only. Various components could be combined or omitted and additional components can be added according to particular needs.

FIG. 3 illustrates another example variable bit-rate controller 124 according to one embodiment of this disclosure. In particular, FIG. 3 illustrates a variable bit-rate controller 124 that alters the quality used by a video encoder 116 to encode video segments, and the controller 124 alters the quality of the encoding as needed. The controller 124 shown in FIG. 3 is for illustration only. Other embodiments of the variable bit-rate controller 124 may be used without departing from the scope of this disclosure.

As shown in FIG. 3, the variable bit-rate controller 124 is coupled to an encoding mechanism 302. The controller 124 includes a rate controller 304, a bit allocator 306, a target bit-rate calculator 308, a target segment encoding quality determinator 310, and a global deviation calculator 312. The encoding mechanism 302, rate controller 304, bit allocator 306, target bit-rate calculator 308, target segment encoding quality determinator 310, and global deviation calculator 312 may operate in the same or similar manner as the corresponding components described above with respect to FIG. 2.

In the illustrated embodiment, the controller 124 includes a quality adjuster 314. In this embodiment, the bit-rate used to encode video segments is regulated by defining maximum and minimum quality constraints. These constraints limit the target segment encoding quality that can be selected by the quality determinator 310. Because the quality adjuster 314 may alter the way in which video information is encoded, the quality adjuster 314 may also be referred to as an encoding adjuster.

In this example, the quality adjuster 314 includes one or more comparators 316 and a quality calculator 318. The comparator 316 receives the identified global deviation from the global deviation calculator 312 and analyzes the deviation. In some embodiments, the comparator 316 determines whether the identified global deviation is too high or too low. In particular embodiments, the comparator 316 determines whether the identified global deviation falls below a first threshold (too low) or exceeds a second threshold (too high), although a single threshold could also be used. The threshold(s) may have any suitable values according to particular needs. The comparator 316 then outputs a signal indicating the results of the comparison.

The quality calculator 318 receives the results from the comparator 316 and adjusts the encoding quality or qualities used by the quality determinator 310. For example, the quality calculator 318 could increase the maximum encoding quality if the identified global deviation is too low. The quality calculator 318 could also decrease the maximum encoding quality if the identified global deviation is too high. The quality calculator 318 could further adjust the minimum encoding quality as needed.

In this way, the quality adjuster 314 may alter the way in which the video information is encoded. For example, setting a minimum quality limit may enable the borrowing of bits from future segments for the current segment. In particular embodiments, when the global deviation is small, the minimum limit is set as close as possible to a "transparent quality." The transparent quality represents the quality where there is no subjectively perceivable difference between the encoded video information from the original information. As a particular example, if a number of consecutive segments of complex content within a video sequence are encoded, the encoded segment bit-rates may increase around this region. This reduces the target segment encoding quality (target quantization increases) to an unacceptable level at the end in order to maintain the target sequence bit-rate. As a result, the minimum quality limit helps to prevent an unacceptable encoding quality when global deviation is not large.

Similarly, setting a maximum quality limit (or minimum target quantization) may enable the storing of bits for future segments. In particular embodiments, this limit is set at the "transparent quality" when the global deviation is small. When a segment achieves transparent quality, it may not be necessary to increase future encoding qualities (or reduce the target quantization) unless the global deviation is very high.

In some embodiments, the target segment encoding quality determinator 310 operates using Equations (3)-(5) above and the following equation in place of Equation (6):

$$Q_{target}[i]=\min[Q_{max\_target},\max(Q_{min\_target},Q_{target}[i-1]+\Delta Q_{target})] \quad (9)$$

where the minimum target quantization ($Q_{min\_target}$) and the maximum target quantization ($Q_{max\_target}$) are provided by the quality calculator 318.

In these embodiments, the quality calculator 318 adjusts the minimum target quantization $Q_{min\_target}$ and the maximum target quantization $Q_{max\_target}$ using the global deviation $T_{deviation}$. In particular embodiments, the quality calculator 318 identifies the minimum target quantization $Q_{min\_target}$ and the maximum target quantization $Q_{max\_target}$ using the equations:

$$Q_{min\_target}=Q_{min\_transparent}+(K_3 \times \min[0,T_{deviation}]) \quad (10)$$

$$Q_{max\_target}=Q_{max\_transparent}+(K_4 \times \max[0,T_{deviation}]) \quad (11)$$

where $K_3$ and $K_4$ are suitably determined constants, and $Q_{min\_transparent}$ and $Q_{max\_transparent}$ are specified or preferred minimum and maximum "transparent quality" quantization limits. In other embodiments, such as the embodiments described above with respect to Equation (8), the minimum target quantization $Q_{min\_target}$ and the maximum target quantization $Q_{max\_target}$ may be determined using one or more suitably determined thresholds for the global deviation.

While FIG. 2 shows the use of a segment adjuster 214 and FIG. 3 shows the use of a quality calculator 318 in the variable bit-rate controller 124, a controller 124 could use both the segment adjuster 214 and the quality calculator 318. In these embodiments, the controller 124 may adjust both the segment size and the encoding quality.

The various components 304-314 of the variable bit-rate controller 124 may represent hardware, software, firmware, or combination thereof. For example, the components 304-314 could represent software routines executed by one or more processors.

Although FIG. 3 illustrates another example of a variable bit-rate controller 124, various changes may be made to FIG. 3. For example, the functional division of the controller 124 shown in FIG. 3 is for illustration only. Various components could be combined or omitted and additional components can be added according to particular needs.

FIG. 4 illustrates an example method 400 for encoding video information using a variable bit-rate according to one embodiment of this disclosure. For ease of explanation, the method 400 is described with respect to the video encoder 116 of FIG. 1. The method 400 could also be used by any other suitable video encoder.

The video encoder 116 receives a first segment of video information at step 402. This may include, for example, the pre-processor 118 receiving a segment of video information from the video source 114. The video segment may have any suitable size.

The video encoder 116 encodes the first video segment at step 404. This may include, for example, the pre-processor 118 performing noise reduction, inverse telecine, scene change detection, and reformatting. This may also include the motion compensator 120 and the transform coder 122 performing MC-DCT coding to encode the pre-processed first segment. One technique for encoding a segment of video information is shown in FIG. 5, which is described below.

The video encoder 116 identifies one or more characteristics about previously encoded video segments at step 406. This may include, for example, the variable bit-rate controller 124 identifying the actual duration or size of the previously encoded video segments. This may also include the controller 124 identifying the expected duration or size of the previously encoded video segments assuming that the previously encoded video segments were encoded using a target bit-rate.

The video encoder 116 determines a global or total deviation using the one or more identified characteristics at step 408. This may include, for example, the variable bit-rate controller 124 identifying a difference between the expected and actual durations of the previously encoded video segments. This may also include the controller 124 identifying a difference between the expected and actual sizes of the previously encoded video segments.

The video encoder 116 adjusts one or more encoding parameters for the next segment of video information to be encoded at step 410. This may include, for example, the variable bit-rate controller 124 adjusting the size or duration of the next video segment to be encoded. This may also include the controller 124 adjusting the encoding quality, such as the maximum or minimum quality, to be used to encode the next video segment.

The video encoder 116 then receives another segment of video information to be encoded at step 412. The video encoder 116 encodes the new segment of video information at step 414. This may include, for example, the video encoder 116 using the one or more adjusted parameters to encode the new segment of video information.

The video encoder 116 detects whether an additional segment of video information is received at step 416. If so, the video encoder 116 returns to step 406 to adjust the encoding parameters (if needed) for the next segment of video information. Otherwise, if no other video segments are received, the method 400 ends.

Although FIG. 4 illustrates one example of a method 400 for encoding video information using a variable bit-rate, various changes may be made to FIG. 4. For example, while the description has described the variable bit-rate controller 124 as forming part of the video encoder 116, the controller 124 could reside separate from the video encoder 116.

FIG. 5 illustrates an example method 500 for encoding a segment of video information according to one embodiment of this disclosure. For ease of explanation, the method 500 is described with respect to the video encoder 116 of FIG. 1. The method 500 could also be used by any other suitable video encoder.

The video encoder 116 encodes the first image or picture in a video segment at step 502. This may include, for example, the pre-processor 118 processing the first image in the segment and the motion compensator 120 and the transform coder 122 performing MC-DCT coding to encode the first image.

The video encoder 116 identifies one or more characteristics about previously encoded images in the video segment at step 504. This may include, for example, the variable bit-rate controller 124 identifying the actual bit-rate and encoding quality of the previously encoded images in the video segment.

The video encoder 116 adjusts one or more encoding parameters for the next image to be encoded at step 506. This may include, for example, the variable bit-rate controller 124 identifying the bit-rate and encoding quality to be used to encode the next image in the video segment. The video encoder 116 then encodes the next image in the segment using the one or more adjusted encoding parameters at step 508.

The video encoder 116 detects whether an additional image in the video segment is to be encoded at step 510. If so, the video encoder 116 returns to step 504 to adjust the encoding parameters (if needed) for the next image. Otherwise, if no other images in the video segment are to be encoded, the method 500 ends.

Although FIG. 5 illustrates one example of a method 500 for encoding a segment of video information, various changes may be made to FIG. 5. For example, while the description has described the variable bit-rate controller 124 as forming part of the video encoder 116, the controller 124 could reside separate from the video encoder 116. Also, any other technique for encoding a segment of video information may be used.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for encoding video information, comprising:
determining a global deviation associated with first video information, the global deviation representing a difference between (1) at least one expected characteristic of the first video information if encoded at a target bit-rate and (2) at least one actual characteristic of the first video information when encoded at the target bit-rate; and
adjusting an encoding parameter used to encode second video information based at least partially on (i) the global deviation, (ii) a segment duration identified by using at least a current video segment, and (iii) a previous global deviation associated with a previous video segment; and wherein a size of a current unencoded video segment is different from a size of a previous unencoded video segment;
wherein adjusting the encoding parameter comprises decreasing the segment duration when an absolute value of the global deviation exceeds a threshold and increasing the segment duration when the absolute value of the global deviation does not exceed the threshold.

2. The method of claim 1, wherein:
the at least one expected characteristic comprises at least one of an expected duration and an expected size of the first video information if encoded at the target bit-rate; and
the at least one actual characteristic comprises at least one of an actual duration and an actual size of the first video information when encoded.

3. The method of claim 1, wherein:
the encoding parameter further comprises at least one of: a maximum encoding quality and a minimum encoding quality; and
the adjusting of the encoding parameter further comprises adjusting at least one of the maximum encoding quality and the minimum encoding quality.

4. A method for encoding video information comprising:
determining a global deviation associated with first video information, the global deviation representing a difference between (1) at least one expected characteristic of the first video information if encoded at a target bit-rate and (2) at least one actual characteristic of the first video information when encoded; and
adjusting an encoding parameter used to encode second video information based at least partially on (i) the global deviation, (ii) a segment duration identified by using at least a current video segment, and (iii) a previous global deviation associated with a previous video segment, wherein a size of the current unencoded video segment is different than a size of the previous unencoded video segment,
wherein the encoding parameter further comprises at least one of a maximum encoding quality and a minimum encoding quality,
wherein the adjusting of the encoding parameter further comprises adjusting at least one of the maximum encoding quality and the minimum encoding quality, and
wherein adjusting the at least one encoding parameter comprises:
decreasing the segment duration when an absolute value of the global deviation exceeds a threshold; and
increasing the segment duration when the absolute value of the global deviation does not exceed the threshold.

5. A method for encoding video information comprising:
determining a global deviation associated with first video information, the global deviation representing a difference between (1) at least one expected characteristic of the first video information if encoded at a target bit-rate and (2) at least one actual characteristic of the first video information when encoded; and
adjusting an encoding parameter used to encode second video information based at least partially on (i) the global deviation, (ii) a segment duration identified by using at least a current video segment, and (iii) a previous global deviation associated with a previous video segment, wherein a size of the current unencoded video segment is different than a size of the previous unencoded video segment, and
wherein the segment duration is identified using a formula of:

$$M_{seg}[i] = \min\left(\frac{K}{|T_{deviation}[i-1]|}, M_{max\_seg}\right)$$

where $M_{seg}[i]$ represents the segment duration for the current video segment, K represents a constant, $T_{deviation}[i-1]$ represents the global deviation associated with the previous video segment, and $M_{max\_seg}$ represents a maximum segment duration.

6. The method of claim 5, wherein the adjusting the encoding parameter comprises:
increasing the maximum encoding quality if the global deviation falls below a first threshold; and
decreasing the maximum encoding quality if the global deviation exceeds at least one of the first threshold and a second threshold.

7. A method for encoding video information, comprising:
determining a global deviation associated with first video information, the global deviation representing a difference between (1) at least one expected characteristic of the first video information if encoded at a target bit-rate and (2) at least one actual characteristic of the first video information when encoded; and
adjusting an encoding parameter used to encode second video information based at least partially on (i) the global deviation, (ii) a segment duration identified by using at least a current video segment, and (iii) a previous global deviation associated with a previous video segment, wherein a size of the current unencoded video segment is different than a size of the previous unencoded video segment,
wherein the encoding parameter further comprises at least one of: a maximum encoding quality and a minimum encoding quality,
wherein the adjusting of the encoding parameter further comprises adjusting at least one of the maximum encoding quality and the minimum encoding quality, and
wherein the maximum encoding quality is associated with a maximum target quantization and the minimum encoding quality is associated with a minimum target quantization; and
adjusting the at least one encoding parameter comprises:
identifying the minimum and maximum target quantizations using formulas of:

$Q\text{min\_target} = Q\text{min\_transparent} + (K_1 \times \min[0, T\text{deviation}])$, $Q\text{max\_target} = Q\text{max\_transparent} + (K_2 \times \max[0, T\text{deviation}])$ where Qmin_target and Qmax_target represent the minimum and maximum target quantizations, Qmin_transparent and Qmax_transparent represent minimum and maximum transparent quality quantization limits, $K_1$ and $K_2$ represent constants, and Tdeviation represents the global deviation.

8. The method of claim 7, wherein adjusting the encoding parameter comprises:
   comparing the global deviation to at least one of a plurality of thresholds; and
   identifying at least one of the segment duration, the minimum encoding quality, and the maximum encoding quality based on the comparison.

9. A method for encoding video information, comprising:
   determining a global deviation associated with first video information, the global deviation representing a difference between (1) at least one expected characteristic of the first video information if encoded as a target bit-rate and (2) at least one actual characteristic of the first video information when encoded; and
   adjusting an encoding parameter used to encode second video information based at least partially on (i) the global deviation, (ii) a segment duration identified by using at least a current video segment, and (iii) a previous global deviation associated with a previous video segment, wherein a size of the current unencoded video segment is different than a size of the previous unencoded video segment,
   wherein the encoding parameter further comprises at least one of: a maximum encoding quality and a minimum encoding quality,
   wherein adjusting the at least one encoding parameter comprises adjusting each of the segment duration, maximum encoding quality, and minimum encoding quality; and
   wherein adjusting the segment duration comprises decreasing the segment duration when an absolute value of the global deviation exceeds a threshold and increasing the segment duration when the absolute value of the global deviation does not exceed the threshold.

10. The method of claim 9, further comprising encoding the second video information by:
    determining a target segment encoding quality for the second video information;
    determining a target instant bit-rate for an image in the second video information using the target segment encoding quality;
    determining a bit allocation for the image using the target instant bit-rate; and regulating the bit-rate for each macro-block in the image based on the bit allocation.

11. The method of claim 10, further comprising adjusting the determined target segment encoding quality based on at least one of a maximum encoding quality and a minimum encoding quality; and
    wherein determining the target instant bit-rate comprises determining the target instant bit-rate using the adjusted target segment encoding quality.

12. The method of claim 9, further comprising encoding the first and second video information using motion compensated discrete cosine transform coding.

13. The method of claim 9, further comprising communicating encoded first and second video information to at least one of a digital versatile disk (DVD) for storage, a hard disk drive for storage, and a network for transport to a receiver.

14. A controller for encoding video information, comprising:
    a global deviation calculator configured to determine a global deviation associated with first video information, the global deviation representing a difference between (1) at least one expected characteristic of the first video information if encoded at a target bit-rate and (2) at least one actual characteristic of the first video information when encoded; and
    an encoding adjuster configured to adjust at least one encoding parameter used to encode second video information, the encoding adjuster configured to adjust the at least one encoding parameter using (i) the global deviation, (ii) a segment duration identified by using at least a current video segment, and (iii) a previous global deviation associated with a previous video segment, wherein a size of a current unencoded video segment is different from a size of a previous unencoded video segment; and
    wherein adjusting the encoding parameter comprises decreasing the segment duration when an absolute value of the global deviation exceeds a threshold and increasing the segment duration when the absolute value of the global deviation does not exceed the threshold.

15. The controller of claim 14, wherein:
    the at least one expected characteristic comprises at least one of an expected duration and an expected size of the first video information if encoded at the target bit-rate; and
    the at least one actual characteristic comprises at least one of an actual duration and an actual size of the first video information when encoded.

16. The controller of claim 14, wherein:
    the at least one encoding parameter comprises at least one of a segment duration, a maximum encoding quality, and a minimum encoding quality; and
    the encoding adjuster is operable to adjust at least one of the segment duration, the maximum encoding quality, and the minimum encoding quality.

17. A controller for encoding video information, comprising:
    a global deviation calculator configured to determine a global deviation associated with first video information, the global deviation representing a difference between (1) at least one expected characteristic of the first video information if encoded at a target bit-rate and (2) at least one actual characteristic of the first video information when encoded; and
    an encoding adjuster configured to adjust at least one encoding parameter used to encode second video information, the encoding adjuster configured to adjust the at least one encoding parameter using (i) the global deviation, (ii) a segment duration identified by using at least a current video segment, and (iii) a previous global deviation associated with a previous video segment,
    wherein a size of the current unencoded video segment is different than a size of the previous unencoded video segment,
    wherein the at least one encoding parameter comprises at least one of a segment duration, a maximum encoding quality, and a minimum encoding quality,
    wherein the encoding adjuster is configured to adjust at least one of the segment duration, the maximum encoding quality, and the minimum encoding quality, and
    wherein the encoding adjuster is configured to adjust the segment duration for the second video information by:
    decreasing the segment duration when an absolute value of the global deviation exceeds a threshold; and
    increasing the segment duration when the absolute value of the global deviation does not exceed the threshold.

18. The controller of claim 17, wherein the encoding adjuster is configured to adjust the maximum encoding quality by:

increasing the maximum encoding quality if the global deviation falls below a first threshold; and decreasing the maximum encoding quality if the global deviation exceeds at least one of the first threshold and a second threshold.

19. The controller of claim 17, wherein the encoding adjuster is configured to adjust the at least one encoding parameter by:

comparing the global deviation to at least one of a plurality of thresholds; and identifying at least one of the segment duration, the minimum encoding quality, and the maximum encoding quality based on the comparison.

20. A controller for encoding video information, comprising:

a global deviation calculator configured to determine a global deviation associated with first video information, the global deviation representing a difference between (1) at least one expected characteristic of the first video information if encoded at a target bit-rate and (2) at least one actual characteristic of the first video information when encoded; and an encoding adjuster configured to adjust at least one encoding parameter used to encode second video information, the encoding adjuster configured to adjust the at least one encoding parameter using (i) the global deviation, (ii) a segment duration identified by using at least a current video segment, and (iii) a previous global deviation associated with a previous video segment, wherein a size of the current unencoded video segment is different than a size of the previous unencoded video segment, wherein the at least one encoding parameter comprises at least one of a segment duration, a maximum encoding quality and a minimum encoding quality, wherein the encoding adjuster is configured to adjust each of the segment duration, maximum encoding quality, and minimum encoding quality; and wherein the encoding adjuster is configured to adjust the segment duration by decreasing the segment duration when an absolute value of the global deviation exceeds a threshold and increasing the segment duration when the absolute value of the global deviation does not exceed the threshold.

21. The controller of claim 20, further comprising:

a target segment encoding quality determinator configured to determine a target segment encoding quality for the second video information;

a target bit-rate calculator configured to determine a target instant bit-rate for an image in the second video information using the target segment encoding quality;

a bit allocator configured to determine a bit allocation for the image using the target instant bit-rate; and a rate controller configured to regulate the bit-rate for each macro-block in the image based on the bit allocation.

22. A video encoding system, comprising:

a video encoder configured to encode video information; and a controller configured to control a bit-rate used by the video encoder to encode the video information, the controller operable to control the bit-rate using a global deviation associated with first video information, the global deviation representing a difference between (1) at least one expected characteristic of the first video information if encoded at a target bit-rate and (2) at least one actual characteristic of the first video information when encoded, wherein the controller is further configured to adjust an encoding parameter used to encode second video information based at least partially on (i) the global deviation, (ii) a segment duration identified by using at least a current video segment, and (iii) a previous global deviation associated with a previous video segment, wherein a size of the unencoded video segment is different from a size of a previous unencoded video segment; and wherein adjusting the encoding parameter comprises decreasing the segment duration when an absolute value of the global deviation exceeds a threshold and increasing the segment duration when the absolute value of the global deviation does not needs the threshold.

23. The video encoding system of claim 22, wherein:

the at least one expected characteristic comprises at least one of an expected duration and an expected size of the first video information if encoded at the target bit-rate; and the at least one actual characteristic comprises at least one of an actual duration and an actual size of the first video information when encoded.

24. The video encoding system of claim 22, wherein:

the encoding parameter comprises at least one of: a maximum encoding quality and a minimum encoding quality; and the controller is configured to adjust at least one of: the maximum encoding quality and the minimum encoding quality.

25. A video encoding system comprising:

a video encoder configured to encode video information; and a controller configured to control a bit-rate used by the video encoder to encode the video information, the controller operable to control the bit-rate using a global deviation associated with first video information, the global deviation representing a difference between (1) at least one expected characteristic of the first video information if encoded at a target bit-rate and (2) at least one actual characteristic of the first video information when encoded, wherein the controller is further configured to adjust an encoding parameter used to encode second video information based at least partially on (i) the global deviation, (ii) a segment duration identified by using at least a current video segment, and (iii) a previous global deviation associated with a previous video segment, wherein a size of the current unencoded video segment is different than a size of the previous unencoded video segment, wherein the encoding parameter comprises at least one of: a maximum encoding quality and a minimum encoding quality, wherein the controller is configured to adjust each of the segment duration, the maximum encoding quality, and the minimum encoding quality based at least partially on the global deviation; and wherein the encoding adjuster is configured to adjust the segment duration by decreasing the segment duration when an absolute value of the global deviation exceeds a threshold and increasing the segment duration when the absolute value of the global deviation does not exceed the threshold.

26. A computer program embodied on a non-transitory computer readable medium and operable to be executed by a processor, the computer program comprising computer readable program code for causing the processor, when executed, to:

determine a global deviation associated with first video information, the global deviation representing a difference between (1) at least one expected characteristic of the first video information if encoded at a target bit-rate and (2) at least one actual characteristic of the first video information when encoded; and adjust at least one encoding parameter used to encode second video information based at least partially on the global deviation, a segment duration identified by using at least a current video segment and a previous global deviation associated with a previous video segment, wherein a size of the current unencoded video segment is different than a size of the previous unencoded video segment;

wherein adjusting the encoding parameter comprises decreasing the segment duration when an absolute value of the global deviation exceeds a threshold and increasing the segment duration when the absolute value of the global deviation does not exceed the threshold.

27. The computer program of claim 26, wherein:

the at least one expected characteristic comprises at least one of an expected duration and an expected size of the first video information if encoded at the target bit-rate; and the at least one actual characteristic comprises at least one of an actual duration and an actual size of the first video information when encoded.

28. The computer program of claim 26, wherein the at least one encoding parameter comprise at least one of a segment duration, a maximum encoding quality, and a minimum encoding quality, and wherein the computer readable program code adjusting the at least one encoding parameter comprises computer readable program code causing the processor, when executed, to adjust at least one of the segment duration, the maximum encoding quality, and the minimum encoding quality based at least partially on the global deviation.

29. A computer program embodied on a non-transitory computer readable medium and operable to be executed by a processor, the computer program comprising computer readable program code for causing the processor, when executed, to:

determine a global deviation associated with first video information, the global deviation representing a difference between (1) at least one expected characteristic of the first video information if encoded at a target bit-rate and (2) at least one actual characteristic of the first video information when encoded; and adjust at least one encoding parameter used to encode second video information based at least partially on the global deviation, a segment duration identified by using at least a current video segment and a previous global deviation associated with a previous video segment, wherein a size of the current unencoded video segment is different than a size of the previous unencoded video segment, wherein the at least one encoding parameter comprises at least one of a segment duration, a maximum encoding quality, and a minimum encoding quality, wherein the computer readable program code adjusting the at least one encoding parameter comprises computer readable program code causing the processor, when executed, to adjust each of the segment duration, the maximum encoding quality, and the minimum encoding quality based at least partially on the global deviation; and wherein the computer readable program code adjusting the segment duration comprises decreasing the segment duration when an absolute value of the global deviation exceeds a threshold and increasing the segment duration when the absolute value of the global deviation does not exceed the threshold.

* * * * *

UNITED STATES PATENT AND TRADEMARK OFFICE
CERTIFICATE OF CORRECTION

| | |
|---|---|
| PATENT NO. | : 8,982,945 B2 |
| APPLICATION NO. | : 10/700877 |
| DATED | : March 17, 2015 |
| INVENTOR(S) | : Hui |

It is certified that error appears in the above-identified patent and that said Letters Patent is hereby corrected as shown below:

In the claims

Column 18, Line 13    Delete: "needs"
                      Insert: --exceed--

Column 19, Line 28    Delete: "comprise"
                      Insert: --comprises--

Signed and Sealed this
Twentieth Day of October, 2015

Michelle K. Lee
*Director of the United States Patent and Trademark Office*